(12) United States Patent
Wright

(10) Patent No.: US 7,784,842 B1
(45) Date of Patent: Aug. 31, 2010

(54) HOLE DIGGING DEVICE

(76) Inventor: Don I. Wright, 1040 Rood Ave., Sacramento, CA (US) 95838

( * ) Notice: Subject to any disclaimer, the term of this patent is extended or adjusted under 35 U.S.C. 154(b) by 13 days.

(21) Appl. No.: 12/425,245

(22) Filed: Apr. 16, 2009

(51) Int. Cl.
*A01B 1/02* (2006.01)
(52) U.S. Cl. ........................................ 294/50.8; 294/57
(58) Field of Classification Search ................ 294/50.7, 294/50.8, 50.9, 57; 56/400.12, 400.16; 172/22
See application file for complete search history.

(56) References Cited

U.S. PATENT DOCUMENTS

| | | | | |
|---|---|---|---|---|
| 199,501 | A | * | 1/1878 | Bowman .................... 294/50.8 |
| 397,383 | A | * | 2/1889 | Nivison ...................... 294/50.8 |
| 1,553,270 | A | | 9/1925 | Saffold |
| 2,349,076 | A | * | 5/1944 | Cole .......................... 294/50.8 |
| 2,710,765 | A | | 6/1955 | Arens |
| D311,853 | S | | 11/1990 | Stormsgaard |
| 5,320,363 | A | * | 6/1994 | Burnham .................... 294/50.8 |
| 5,478,128 | A | | 12/1995 | Aaland |
| 5,669,648 | A | | 9/1997 | Luck |
| 5,685,587 | A | * | 11/1997 | Putnam, Jr. ................ 294/50.5 |
| 5,836,630 | A | * | 11/1998 | Putnam, Jr. ................ 294/50.5 |
| 6,439,629 | B1 | | 8/2002 | Bieth |

* cited by examiner

*Primary Examiner*—Paul T Chin

(57) ABSTRACT

A hole digging device comprising a shaft having a crossbar perpendicularly attached; a push rod parallel to the shaft; a circular base on the second end of the push rod and a handle on the first end of the push rod, wherein the handle, push rod, and base can altogether move between an up position and a down position; two braces attached to the shaft on opposing sides; two digging blades pivotally attached to the braces, wherein the digging blades can pivot between an engaged position or a disengaged position; two blade shafts parallel to the central shaft, wherein the digging blades are pivotally attached to the blade shafts; two grasping loops pivotally attached to the crossbar opposite each other and moveable between an up position and a down position; wherein the grasping loops are biased in the down position caused by springs.

4 Claims, 5 Drawing Sheets

HOLE DIGGING DEVICE

FIELD OF THE INVENTION

The present invention is directed to a device for digging holes in soil or other materials, more particularly to a digging device comprising digging blades that can be pivoted inwardly to help remove soil from a particular region of the ground.

BACKGROUND OF THE INVENTION

Digging holes in soil or other materials can be particularly strenuous and time consuming. The present invention features a hole digging device. The digging device of the present invention comprises blades that can be pivoted inwardly to provide an easier means of removing soil from the ground. The device can help a user dig a hole more easily and more efficiently.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
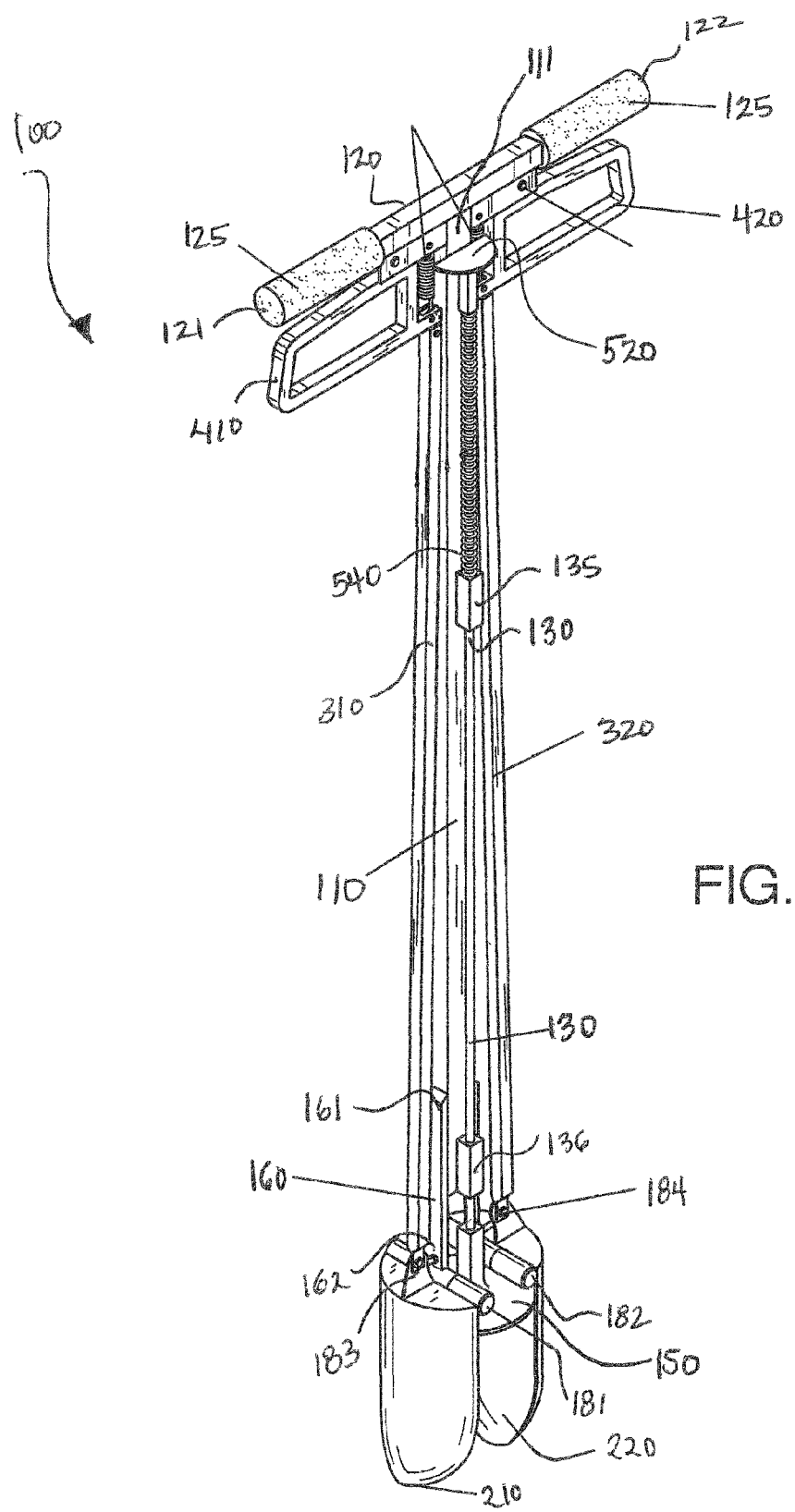
FIG. 1 is a perspective view of the hole digging device of the present invention.

The following is a listing of numbers corresponding to a particular element refer to herein:

100 hole digging device
110 central shaft
111 first end of central shaft
112 second end of central shaft
120 crossbar
121 first side end of crossbar
122 second side end of crossbar
130 push rod
135 first rod guide
136 second rod guide
150 base
160 first support brace
161 first end of first support brace
162 second end of first support brace
170 second support brace
171 first end of second support brace
172 second end of second support brace
181 first hinge
182 second hinge
183 third hinge
184 fourth hinge
210 first digging blade
220 second digging blade
310 first digging blade shaft
311 first end of first digging blade shaft
312 second end of first digging blade shaft
320 second digging blade shaft
321 first end of second digging blade shaft
322 second end of second digging blade shaft
330 first grasping loop spring
340 second grasping loop spring
410 first grasping loop
420 second grasping loop
431 first pivot component
432 second pivot component
520 pushing handle
540 push rod spring Referring now to FIGS. 1-4, the present invention features a hole digging device 100. Without wishing to limit the present invention to any theory or mechanism, it is believed that the hole digging device 100 of the present invention may allow a user to dig a hole more precisely, efficiently, and/or effectively.

The hole digging device 100 comprises a central shaft 110 having a first end 111 and a second end 112. A crossbar 120 is fixedly attached to the first end 111 of the central shaft 110, generally perpendicularly to the central shaft 110. The crossbar 120 has a first side end 121 and a second side end 122. In some embodiments, a handle 125 is disposed on the first side end 121 and/or the second side end 122 for allowing a user to easily grip the hole digging device 100. In some embodiments, the handles 125 are constructed from a material comprising a rubber.

Oriented in front of the central shaft 110 (e.g., next to a front portion of the central shaft 110) and generally parallel to the central shaft 110 is a push rod 130. The push rod 130 has a first end and a second end 132. The first end of the push rod 130 extends upwardly toward the crossbar 120 and the second end 132 of the push rod 130 extends downwardly toward the second end 112 of the central shaft 110.

Slidably disposed near the first end of the push rod 130 is a first rod guide 135. The first rod guide 135 is adapted for allowing the push rod 130 to move upwardly and downwardly through the first rod guide 135. The first rod guide 135 is fixedly attached to the central shaft 110, for example near the first end 111 of the central shaft 110 or near a middle portion of the central shaft 110. In some embodiments, the first rod guide 135 can help keep the push rod 130 aligned properly when the push rod is pushed downwardly.

In some embodiments a second rod guide 136 is slidably disposed near the second end 132 of the push rod 130. The second rod guide 136 is fixedly attached to the central shaft 110, for example at or near the second end 112 of the central shaft 110. Like the first rod guide 135, the second rod guide 136 is adapted to allow the push rod 130 to move upwardly and downwardly through the second rod guide 136.

Disposed on the first end of the push rod 130 is a pushing handle 520. The pushing handle 520 together with the push rod 130 can move between an up position and a down position. The pushing handle 520 and push rod 130 are biased in the up position caused by a push rod spring 540. The push rod spring 540 extends between the pushing handle 520 and the first rod guide 135 (e.g., and surrounds the push rod 130). A user can push down on the pushing handle 520 so as to push the push rod 130 downwardly.

Attached to the second end 132 of the push rod 130 is a base 150. In some embodiments, the base 150 is generally flat having a top surface and a bottom surface. In some embodiments, the base 150 is generally circular. In some embodiments, the base 150 X-shaped or T-shaped (or in the shape of a plus sign). In some embodiments, the second end 132 of the push rod 130 is attached to the top surface of the base 150, for example in a middle region of the base 150.

The push rod 130 is attached to the base 150 such that when the push rod 130 is pushed downwardly via the pushing handle 520, the base 150 is pushed downwardly along with the push rod 130.

In some embodiments, a first support brace 160 is attached to the central shaft 110 at the second end 112. For example, the first end 161 of the first support brace 160 is attached to the central shaft 110 near the second end 112 (e.g., above the second end 112) and the second end 162 of the first support brace 160 extends downwardly toward (but not all the way to) the base 150. Disposed on the second end 162 of the first support brace 160 is a first hinge 181. Pivotally attached to the first hinge 181 is a first digging blade 210.

In some embodiments, a second support brace 170 is attached to the central shaft 110 opposite the first support brace 160. For example, the first end 171 of the second support brace 170 is attached to the central shaft 110 near the second end 112 (e.g., above the second end 112) and opposite where the first support brace 160 is attached. The second end 172 of the second support brace 170 extends downwardly toward (but not all the way to) the base 150. Disposed on the second end 172 of the second support brace 170 is a second hinge 182. Pivotally attached to the second hinge 181 is a second digging blade 220.

Figure 2:
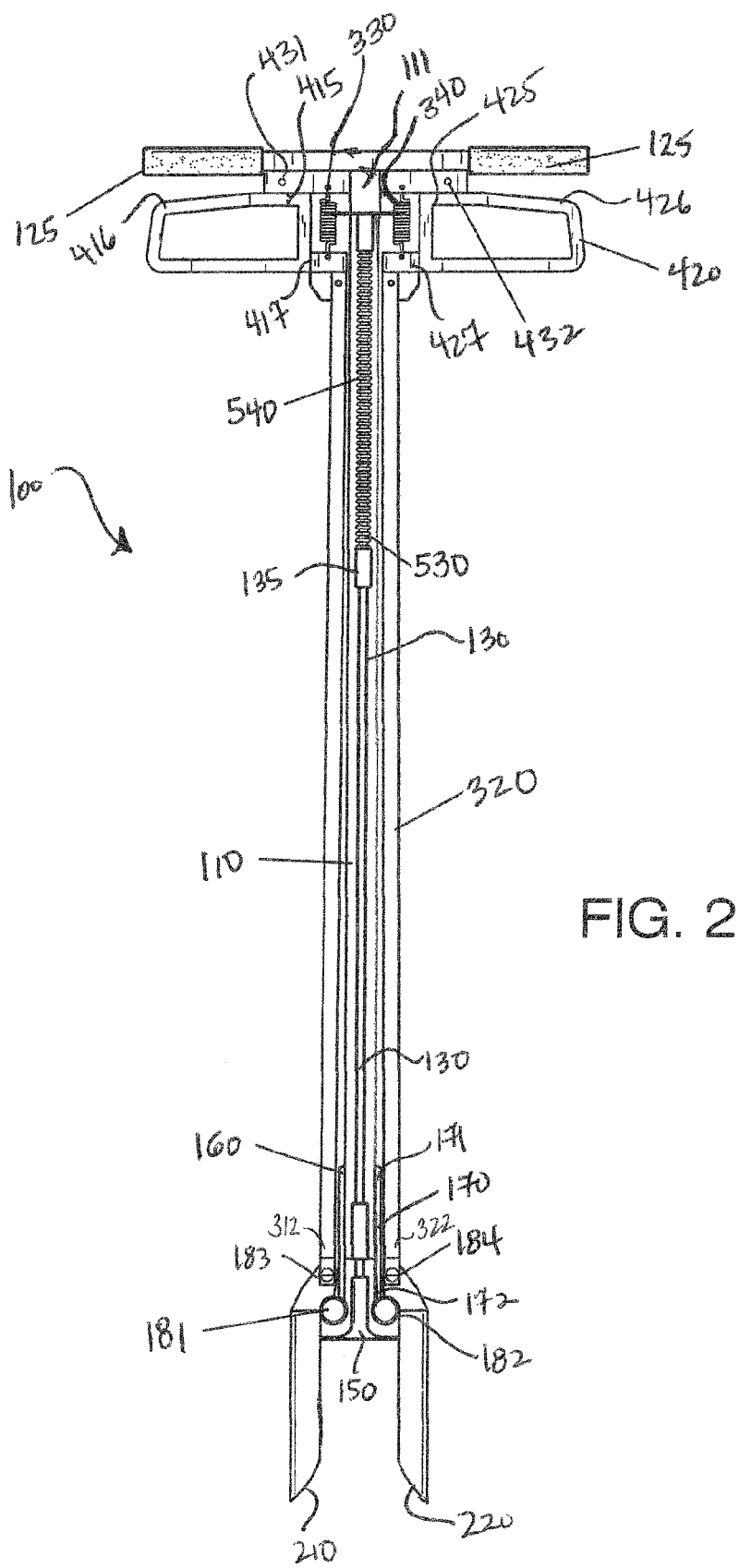
FIG. 2 is a front view of the hole digging device of the present invention, wherein the hole digging device is in the disengaged position.
Figure 2A:
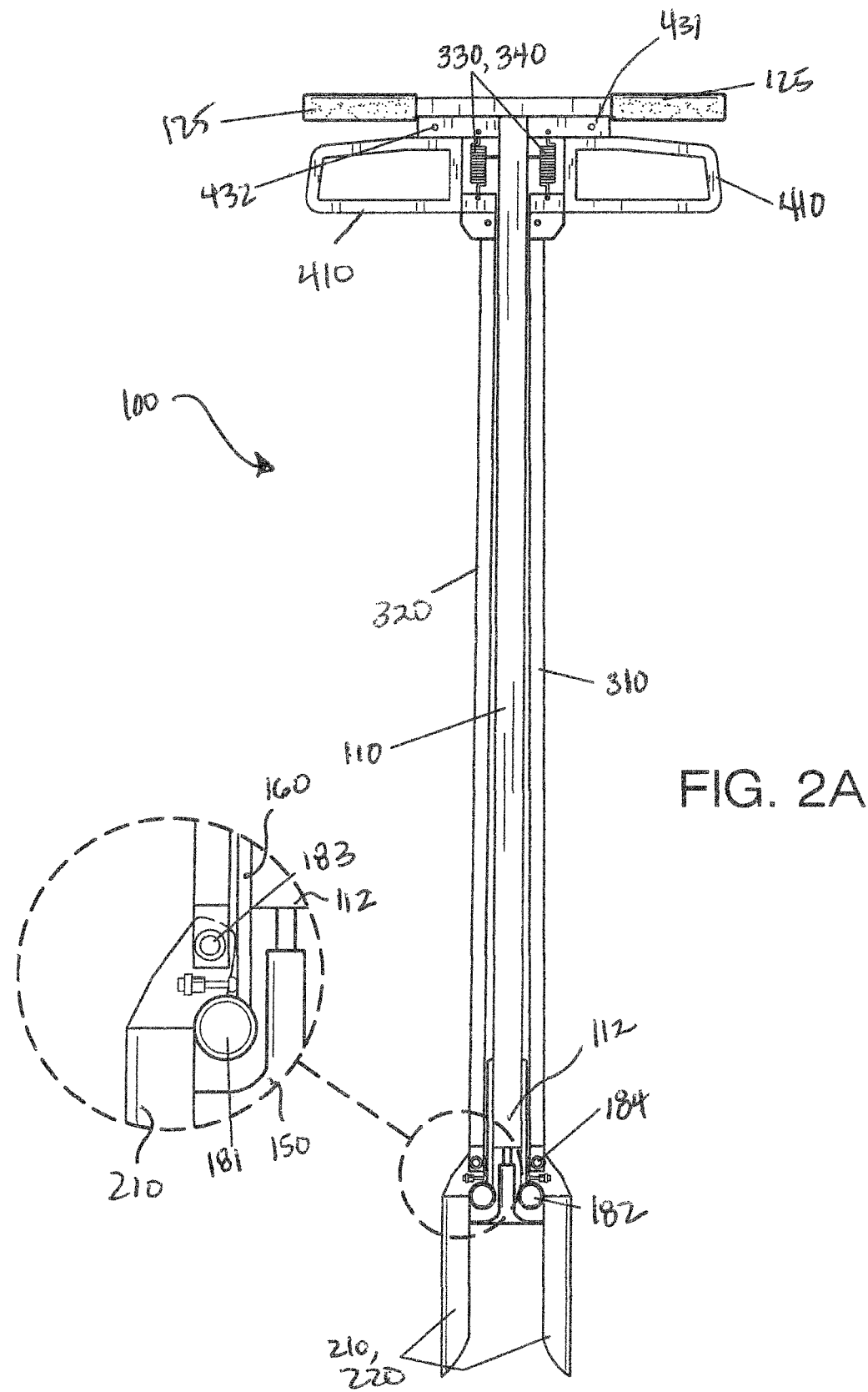
FIG. 2A is a back view of the hole digging device of FIG. 2.
Figure 3:
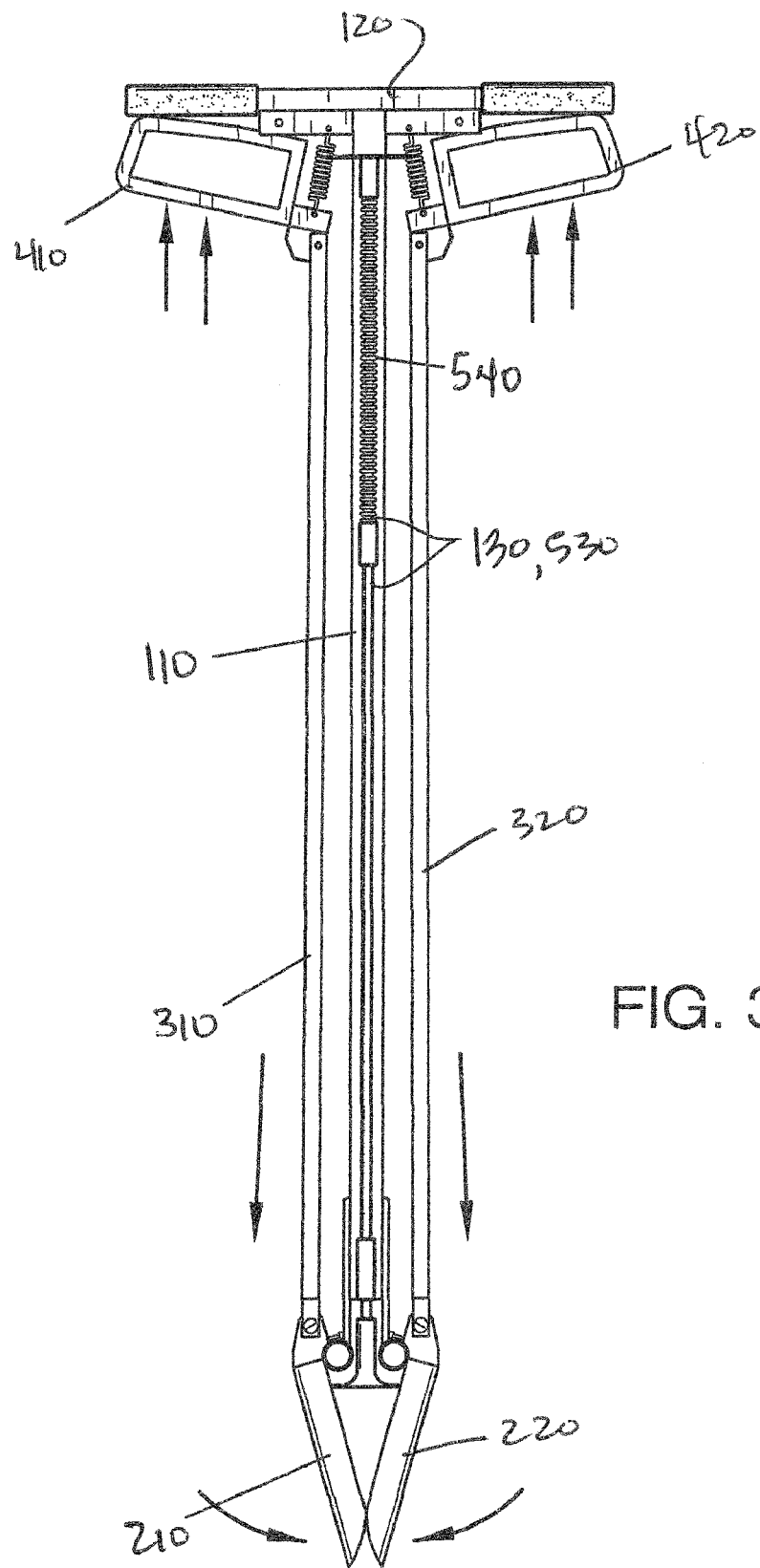
FIG. 3 is a front view of the hole digging device of the present invention, wherein the hole digging device is in the engaged position.
Figure 4:
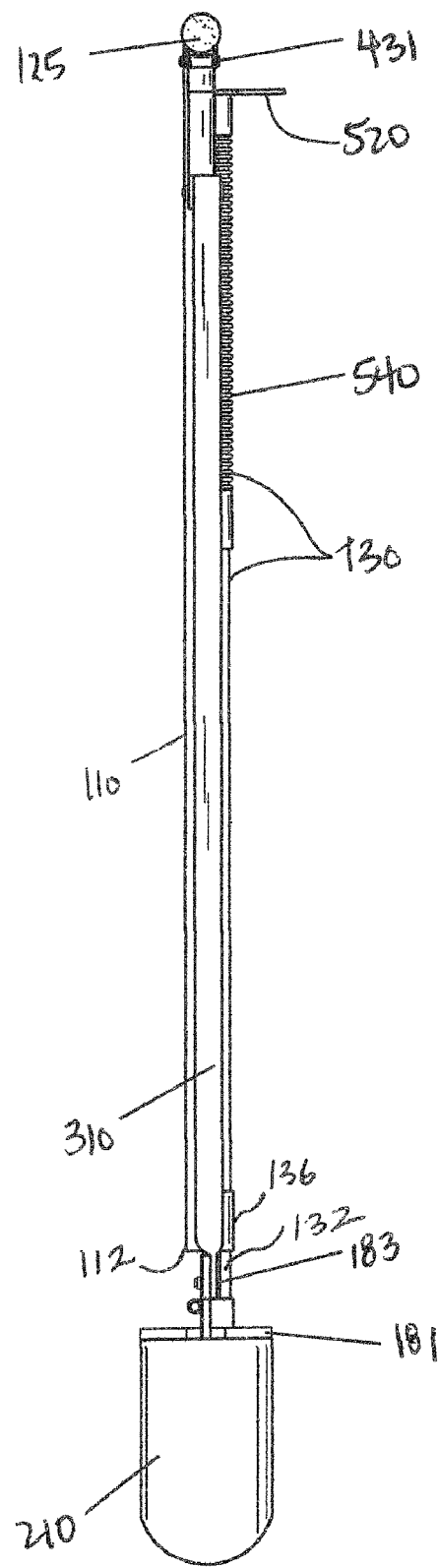
FIG. 4 is a side view of the hole digging device of the present invention.

The first digging blade 210 and second digging blade 220 are oriented to face each other (see FIG. 2). The first digging blade 210 and second digging blade 220 are oriented around the base 150 (e.g., the base 150 is surrounded by the digging blades). The digging blades can pivot inwardly towards each other, corresponding to an engaged position (see FIG. 3). The digging blades can pivot outwardly away from each other, corresponding to a disengaged position (see FIG. 2). A user can drive the digging blades into the soil and pivot them to the engaged position. The digging blades may help collect soil when in the engaged position. Such digging blades and tools for digging are well known to one of ordinary skill in the art.

In some embodiments, the first digging blade 210 is also pivotally attached to a second end 312 of a first digging blade shaft 310 via a third hinge 183. The first end 311 of the first digging blade shaft 310 extends upwardly toward the crossbar 120. The first end 311 is attached to a first grasping loop 410. The first grasping loop 410 is oriented just below the crossbar 120.

In some embodiments, the second digging blade 220 is also pivotally attached to a second end 322 of a second digging blade shaft 320 via a fourth hinge 184. The first end 321 of the second digging blade shaft 320 extends upwardly toward the crossbar 120. The first end 321 is attached to a second grasping loop 420. The second grasping loop 420 is oriented just below the crossbar 120, opposite the first grasping loop 310.

In some embodiments, the first grasping loop 410 (e.g., an inner top corner 415) is pivotally attached to the crossbar 120 via a first pivot component 431. In some embodiments, the second grasping loop 420 (e.g., an inner top corner 425) is pivotally attached to crossbar 120 via a second pivot component 432.

The first grasping loop 410 can pivot between an up position (e.g., an outer top corner 416 is moved upwardly toward the crossbar 120) and a down position (e.g., the outer top corner 416 is moved downwardly away from the crossbar 120). The second grasping loop 420 can pivot between an up position (e.g., an outer top corner 426 is moved upwardly toward the crossbar 120) and a down position (e.g., the outer top corner 426 is moved downwardly away from the crossbar 120).

The first grasping loop 410 is biased in the down position caused by a first grasping loop spring 330. In some embodiments, the first grasping loop spring 330 is attached to both the inner bottom corner 417 of the first grasping loop 410 and to the crossbar 120, pulling the inner bottom corner 417 of the first grasping loop 410 toward the crossbar 120.

The second grasping loop 420 is biased in the down position caused by a second grasping loop spring 340. The second grasping loop spring 340 is attached to both the inner bottom corner 427 of the second grasping loop 420 and to the crossbar 120, pulling the inner bottom corner 427 of the second grasping loop 420 toward the crossbar 120.

When the first grasping loop 410 (or second grasping loop 420) is pivoted to the up position, the inner bottom corner 417 of the first grasping loop 410 (or second grasping loop 420) is pushed downwardly, for example in the direction of the digging blades. This motion causes the first digging blade shaft 310 (or second digging blade shaft 320) to push down on the first digging blade 210 (or second digging blade 220). The force causes the first digging blade 210 (or second digging blade 220) to pivot to the engaged position.

Releasing the first grasping loop 410 (or second grasping loop 420) causes the first grasping loop 410 (or second grasping loop 420) to revert to the down position and the first digging blade 210 (or second digging blade 220) returns to the disengaged position.

To move the grasping loops to the up position, a user must grip the first grasping loop 410 and second grasping loop 420 and squeeze them up towards the crossbar 120.

To use the hole digging device 100 of the present invention, a user can drive the digging blades into the soil (or other material in the ground surface). Next, if the user choose to, he/she can manually rotate the hole digging device 100 by twisting the crossbar 120. The user can then pull the grasping loops upwardly toward the crossbar 120, which causes the digging blades to pivot to the engaged position. Soil is gripped between the two digging blades. The user can pull the device 100 out of the soil while grasping the soil between the digging blades. The user then releases the grasping loops, which causes the digging blades to return to the disengaged position. In some cases, the soil between the digging blades is dropped from between the digging blades. In some examples, the user may push down on the pushing handle 520 to push the push rod 130 and base 150 downwardly. This motion can help push soil out of the digging blades.

The hole digging device 100 of the present invention may be constructed from a variety of materials. For example, in some embodiments, the hole digging device 100 is constructed from a material comprising a metal (e.g., steel), a plastic, the like, or a combination thereof.

The hole digging device 100 may be constructed in a variety of sizes. For example, in some embodiments, the central shaft 110 is between about 40 to 50 inches in length as measured from the first end 111 to the second end. In some embodiments, the central shaft 110 is between about 50 to 60 inches in length as measured from the first end 111 to the second end 112. The hole digging device 100 is not limited to the aforementioned sizes.

As used herein, the term "about" refers to plus or minus 10% of the referenced number. For example, an embodiment wherein the central shaft 110 is about 60 inches in length includes a central shaft 110 that is between 54 and 66 inches in length.

The following the disclosures of the following U.S. Patents are incorporated in their entirety by reference herein: U.S. Pat. No. 1,553,270; U.S. Pat. No. 5,478,128; U.S. Pat. No. 2,710,765; U.S. Pat. No. 5,669,648; U.S. Pat. No. 6,439,629.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A hole digging device comprising:
   (a) a central shaft having a first end and a second end, wherein a crossbar is generally perpendicularly attached to the first end of the central shaft;
   (b) a push rod oriented generally parallel to the central shaft, the push rod having a first end extending upwardly toward the crossbar and a second end extending downwardly toward the second end of the central shaft;
   (c) a first rod guide fixedly attached to a portion of the central shaft and adapted for allowing the push rod to slide upwardly and downwardly though the first rod guide; wherein the first rod guide can help keep the push rod aligned when the push rod is slid upwardly and downwardly;
   (d) a generally flat circular base attached to the second end of the push rod and a pushing handle disposed on the first end of the push rod, wherein the pushing handle, push rod, and base can altogether move between an up position and a down position and are biased in the up position caused by a push rod spring that extends between the pushing handle and the first rod guide;
   (e) a first support brace and a second support brace each attached to the central shaft at the second end on opposing sides; wherein a first hinge is disposed on an end of the first support brace and a second hinge is disposed on an end of the second support brace;
   (f) a first digging blade pivotally attached to the first hinge and a second digging blade pivotally attached to the second hinge; wherein the first digging blade and second digging blade both surround the base and are oriented to face each other; wherein digging blades can together pivot inwardly towards each other to an engaged position or together pivot outwardly away from each other to a disengaged position;
   (g) a first digging blade shaft and second digging blade shaft both oriented generally parallel to the central shaft and opposite each other, wherein the first digging blade is pivotally attached to a second end of the first digging blade shaft via a third hinge and the second digging blade is pivotally attached to a second end of the second digging blade shaft via a fourth hinge;
   (h) a first grasping loop having an inner top corner, an outer top corner, and an inner bottom corner, wherein the inner top corner is pivotally attached to the crossbar via a first pivot component and the inner bottom corner is connected to a first end of the first digging blade shaft;
   wherein the first grasping loop can pivot between an up position such that the outer top corner is moved upwardly toward the crossbar and a down position such that the outer top corner is moved downwardly away from the crossbar;
   wherein the first grasping loop is biased in the down position caused by a first grasping loop spring attached to both the inner bottom corner of the first grasping loop and to the crossbar; and
   (i) a second grasping loop having an inner top corner, an outer top corner, and an inner bottom corner, wherein the inner top corner is pivotally attached to the crossbar via a second pivot component and the inner bottom corner is connected to a first end of the second digging blade shaft;
   wherein the second grasping loop can pivot between an up position such that the outer top corner is moved upwardly toward the crossbar and a down position such that the outer top corner is moved downwardly away from the crossbar;
   wherein the second grasping loop is biased in the down position caused by a second grasping loop spring attached to both the inner bottom corner of the second grasping loop and to the crossbar;
   wherein when the first grasping loop and second grasping loop are both pivoted to the up position, the inner bottom corners of the both the grasping loops are pushed downwardly to cause the respective digging blade shaft to push down on the respective digging blade so as to pivot the digging blade to the engaged position; wherein releasing both the grasping loops causes the grasping loops to return to the down position and the digging blades to return to the disengaged position.

2. The hole digging device of claim 1, wherein a handle is disposed on both a first end and a second end for allowing a user to easily grip the hole digging device.

3. The hole digging device of claim 2, wherein the handles are constructed from a material comprising a rubber.

4. The hole digging device of claim 1, wherein a second rod guide is fixedly attached to the central shaft near the second end and is adapted to allow the push rod to move upwardly and downwardly through the second rod guide.

\* \* \* \* \*